April 22, 1952 R. L. CAMPBELL 2,593,842

PHASE DISCRIMINATOR

Filed Aug. 13, 1947 2 SHEETS—SHEET 1

Richard L. Campbell, INVENTOR

BY Charles W. Mortimer

April 22, 1952 R. L. CAMPBELL 2,593,842

PHASE DISCRIMINATOR

Filed Aug. 13, 1947 2 SHEETS—SHEET 2

INVENTOR
Richard L. Campbell
BY Charles W. Mortimer
ATTORNEY

Patented Apr. 22, 1952

2,593,842

UNITED STATES PATENT OFFICE 2,593,842

PHASE DISCRIMINATOR

Richard L. Campbell, Melrose, Mass., assignor to Allen B. Du Mont Laboratories, Inc., Passaic, N. J., a corporation of Delaware Application August 13, 1947, Serial No. 768,366

2 Claims. (Cl. 250—27)

This invention relates to a device for producing pulses for synchronizing purposes, such as pulses for vertical and horizontal synchronization in television systems.

With this invention a stabilizing control is provided for a synchronizing generator. In carrying out the invention high ratios of frequency-division are used to produce correspondingly lower frequencies without interfering with the stability.

Heretofore, a standard frequency of 31,500 cycles per second has been generated and divided 7 to 1, 5 to 1, 5 to 1 and 3 to 1 to produce 60 cycles per second for vertical synchronizing purposes in television. The 31,500 frequency was also divided in half to obtain the 15,750 cycles per second for horizontal synchronizing purposes.

It is very important to have frequency dividers that are stable since any instability thereof causes incorrect divider ratios which result in objectionable interruptions of the received program. It has heretofore been impractical to use oscillator stages to divide frequencies at a ratio above 10 to 1, so that the above mentioned ratios were used to obtain 60 cycles per second, thus necessitating the use of four oscillators for this purpose.

With the present invention much higher ratios of division can be safely used thus correspondingly reducing the number of oscillators or tubes for this purpose. For instance, the frequency division can safely be made in two steps at a ratio of 25 to 1 and 21 to 1 to obtain a frequency of 60 cycles per second for the vertical synchronizing frequency, thus dispensing with half of the tubes or oscillators in the vertical channel. The 2 to 1 division of the 31,500 cycles per second can be made for horizontal synchronization at 15,750 cycles per second as usual.

It is well known that television synchronization generators that are synchronized with 60 cycles per second supply systems vary in frequency with the frequency of the supply. Low ratio dividers will follow the frequency variations imposed on the master oscillators but when ratios of as high as about 15 to 1 were used their frequencies changed to 14 to 1 or 16 to 1, thus blurring or spoiling the picture on the television receiver.

The invention may be understood from the description in connection with the accompanying drawings, in which.

Figure 1:
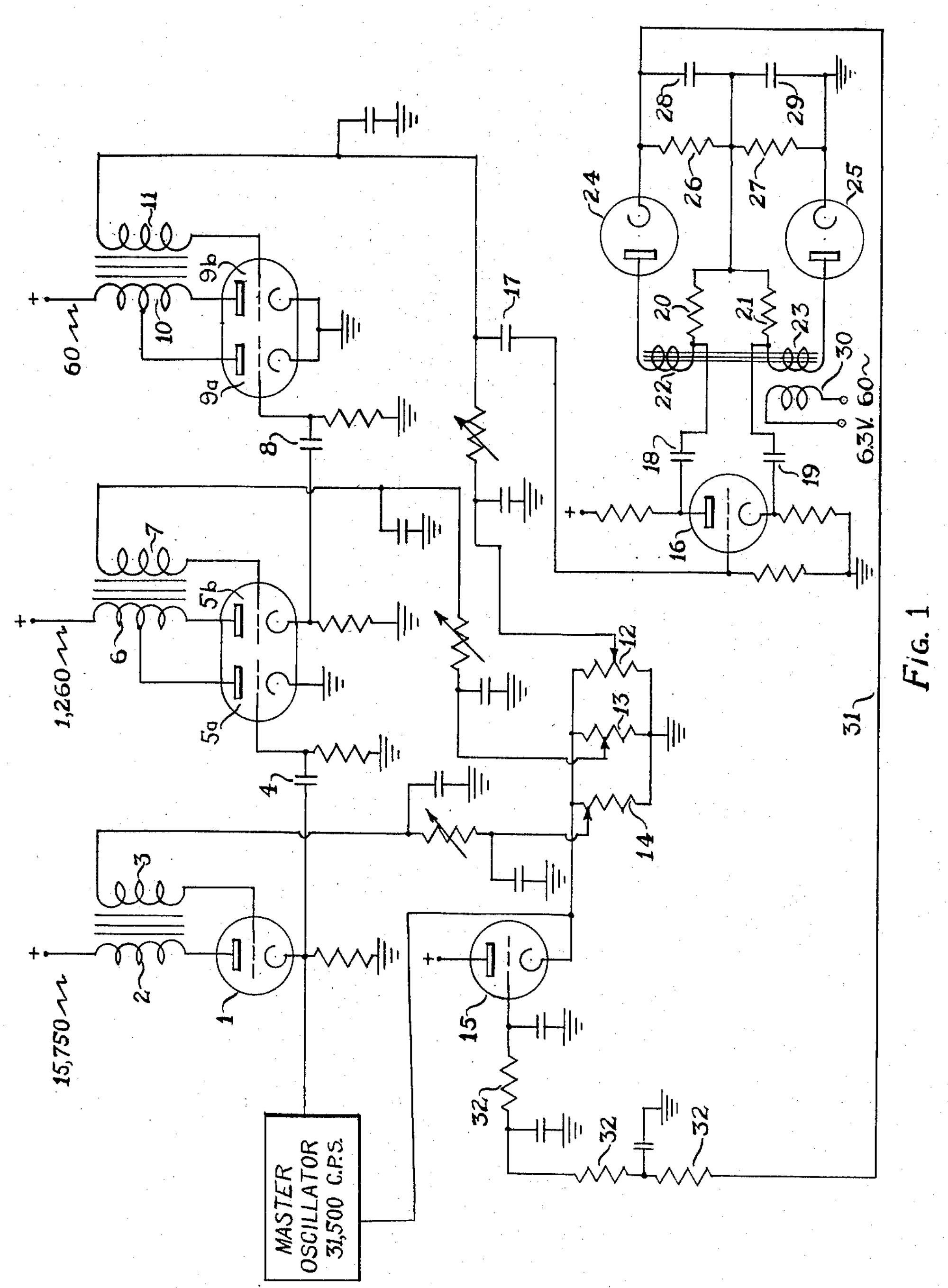
Fig. 1 is a diagram of connections showing means for keeping the frequency stabilized.

In the drawings reference character 1 indicates an oscillator that has its cathode biased by resistance and connected to a master oscillator having a frequency of 31,500 cycles per second. This master oscillator is also coupled by the condenser 4 to the control grid of the buffer amplifier 5*a* that is connected to the oscillator 5*b* that is adapted to divide the frequency from the master oscillator in the proportion of 25 to 1. The oscillator 5*b* is coupled by condenser 8 to the grid of the buffer amplifier 9*a* that is connected to the oscillator 9*b* that is adapted to divide the frequency of oscillator 5*b* in the ratio of 21 to 1. The frequency regulator comprises three resistors 12, 13 and 14 in parallel, each having one end grounded and the other end connected to the cathode of triode 15.

A triode 16 has its grid coupled by condenser 17 to the secondary 11 of the transformer for the oscillator 9*b*. The cathode of triode 16 is biased by a resistor. The plate and cathode respectively of the triode 16 are connected by condensers 18 and 19 to the ends of resistors 20 and 21 and to the ends of inductance coils 22 and 23, which are connected at their other ends to the plates of the diodes 24 and 25. The other ends of the resistors 20 and 21 are connected to a point between the resistors 26 and 27 and condensers 28 and 29.

The coils 22 and 23 are secondaries of a transformer having a primary coil 30 connected to a source of 60 cycle current which may be at 6.3 volts. The elements 16—30 constitute a phase discriminator.

A lead 31 extends from the cathode of tube 24 through resistances 32 to the grid of amplifier tube 15.

The oscillators 1, 5*b* and 9*b* produce sawtooth waves of 15,750; 1,260; and 60 cycles respectively.

Figure 2:
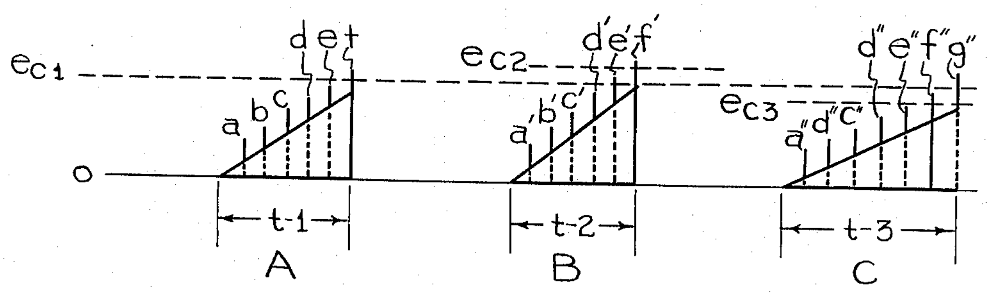
Fig. 2 shows a time diagram of the relationship of grid bias and frequency to division ratio.

Fig. 2 shows three sawtooth waveforms A, B and C, with higher frequency synchronizing pulses represented as short vertical lines riding on each lettered *a* to *g*. The horizontal coordinate represents time, the vertical, voltage. The horizontal broken lines marked $e_{c1}$, $e_{c2}$, $e_{c3}$ represent the various grid bias levels.

The operation is as follows:

The constants for the oscillators 1, 5*b* and 9*b* are so chosen that the frequency of the oscillator 1 is normally 15,750 cycles per second, that of oscillator 5*b* is 1,260 cycles per second and that of oscillator 9*b* is 60 cycles per second. That is, the ratio of the master oscillator frequency to oscillator 5*b* is 25 to 1, and the ratio of oscillator 5*b* to oscillator 9*b* is 21 to 1.

The current through coil 30 causes the tubes 24 and 25 to pass current alternately when the potential from the 6.3 v. source is applied to primary 30, since the plates of these tubes are connected to opposite ends of the respective coils 22 and 23. Each tube conducts for half a cycle, alternating with the other one. When only the potential from coil 30 is applied, each tube 24 and 25 rectifies equally and the voltages across resistors 26 and 27 cancel each other so no voltage is applied to the lead 31.

When the sawtooth wave from coil 11 is in phase with the voltage in coil 30 and is coupled by condenser 17 to amplifier 16 and applied between the resistor 20 and coil 22, as well as between the resistor 21 and coil 23, the rectification in tubes 24 and 25 are still equal so that no voltage is yet applied to the lead 31.

However when the sawtooth wave through coil 11 starts to shift with respect to the sine wave through coil 30 due to a slight change in frequency, an unbalance takes place between them so that the vectorial sum of the two is greater in one direction or the other depending upon which one is leading. The result is that the current through diode 24 or diode 25 becomes larger, and that through the other becomes smaller, depending upon whether the frequency of the sawtooth voltage from coil 11 becomes lower or higher than that of coil 30.

This causes a higher or lower potential upon lead 31 which increases or decreases the current through tube 15. This raises or lowers the potentials on the points of resistors 12, 13 and 14 where the contacts connect them to the coils 3, 7 and 11 as well as the control grids of tubes 1, 5*b* and 9*b* to which these points are connected, thereby keeping the frequencies of these tubes at the desired points with very little if any variation.

How this is accomplished can best be described in connection with the time diagrams of Fig. 2. For simplicity, the divider ratio is considered to be six in the explanation which follows. Other ratios as high as 25 or more can be used.

The first diagram marked A is the vertical sawtooth wave of the oscillator to be controlled. On it are six short vertical lines lettered *a*, *b*, *c*, *d*, *e* and *f* representing the synchronizing pulses from the previous oscillator. The horizontal broken line marked $e_{c1}$ is the normal grid firing point. Should the original frequency speed up it will be represented by the diagram marked B that has a shorter base $t_2$, due to the shorter repetition time. The intervals between the synchronizing pulses are also shorter. This brings the fifth synchronizing pulse $e'$ to the firing level $e_{c1}$ and the controlled oscillator divides by 5 instead of by 6. It will be noted that if the grid bias were made more negative, for instance, changed to the value represented by the broken line marked $e_{c2}$ the 6th synchronizing pulse $f'$ would be the first to reach it and the controlled oscillator would again divide by 6 although it would operate at a higher frequency. It is the function of the phase discriminator circuit to supply this correcting voltage.

Similarly when the frequency to be divided runs slower than normal it may be represented by the diagram C with a longer repetition time $t_3$. The intervals between synchronizing pulses are also longer. It will be noted that the short vertical line $g''$ reaches the firing point $e_{c1}$ first and fires the controlled oscillator. However, it can also be seen that if the grid bias is raised to that represented by the horizontal dotted line $e_{c3}$ again the 6th pulse $f''$ will be the first to reach it and fire the controlled oscillator as before.

It is the function of the voltage on conductor 31 obtained from the phase discriminator 16—30 and coupled through the cathode follower 15 to shift the bias on the various oscillators 1, 5*b* and 9*b* by the proper amount and in the proper direction to retain the correct division ratio with changes in the frequency of the nominally 60 cycles per second source.

What is claimed is:

1. In a synchronizing generator, a phase discriminator circuit for comparing the output frequency of a first voltage wave to the frequency of another voltage wave, said discriminator comprising a pair of diodes, an input circuit for each of said diodes, each of said input circuits comprising a winding of a transformer in series with the plate cathode circuit of the rectifier, and a resistor in series with said transformer winding, said resistor forming a portion of a resistance-capacitance coupling circuit, means for applying said last named voltage to said transformer windings, said means comprising a primary winding to which said voltage is applied, said first-named winding being connected to apply the transformed voltage in opposite polarity to said rectifier tubes, means for applying the output voltage of the last of said dividers to said rectifier circuit, said last named means comprising a phase inverter having a pair of outputs, each of said outputs being connected to one of said resistors, a load circuit for each of said rectifier tubes, said load circuits being connected in series, and a low pass filter across the output of said phase discriminator.

2. A phase discriminator circuit comprising a pair of rectifiers; a pair of input circuits; a first source of signal voltage; means for coupling said source to said rectifiers to apply said signal voltage in opposite polarity to said rectifiers, said means comprising a portion of each of said input circuits; a second source of second signal voltage; means for coupling said second source to apply said second signal voltage in opposite polarity to said rectifiers, said last-named means comprising another portion of each of said input circuits; a load circuit for each of said rectifiers across which the output voltage of said rectifiers appears, said load circuits being connected in series to obtain the sum of said output voltages.

RICHARD L. CAMPBELL.

REFERENCES CITED

The following references are of record in the file of this patent:

UNITED STATES PATENTS

| Number | Name | Date |
|---|---|---|
| 2,250,284 | Wendt | July 22, 1941 |
| 2,312,079 | Crosby | Feb. 23, 1943 |
| 2,350,536 | Schlesinger | June 6, 1944 |
| 2,420,303 | De France | May 13, 1947 |

FOREIGN PATENTS

| Number | Country | Date |
|---|---|---|
| 558,578 | Great Britain | Jan. 11, 1944 |